(12) United States Patent
Gossett et al.

(10) Patent No.: US 8,130,881 B1
(45) Date of Patent: Mar. 6, 2012

(54) MIMO WITH REDUCED COMPUTE COMPLEXITY

(75) Inventors: Carroll Philip Gossett, Mountain View, CA (US); Michial Allen Gunter, Oakland, CA (US); Paul K. Rodman, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 681 days.

(21) Appl. No.: 12/244,401

(22) Filed: Oct. 2, 2008

Related U.S. Application Data (60) Provisional application No. 61/046,652, filed on Apr. 21, 2008.

(51) Int. Cl.
*H04B 1/10* (2006.01)
(52) U.S. Cl. ........................................................ 375/350
(58) Field of Classification Search .................. 375/260, 375/267, 285, 16, 346, 350
See application file for complete search history.

(56) References Cited

U.S. PATENT DOCUMENTS

| | | | |
|---|---|---|---|
| 5,864,545 A * | 1/1999 | Gonikberg et al. | 370/286 |
| 6,829,289 B1 | 12/2004 | Gossett et al. | |
| 7,142,536 B1 | 11/2006 | Gossett et al. | |
| 7,711,035 B2 * | 5/2010 | Cairns et al. | 375/148 |
| 2004/0096022 A1 * | 5/2004 | Zhang | 375/353 |
| 2005/0047482 A1 | 3/2005 | Gossett et al. | |
| 2008/0181285 A1 * | 7/2008 | Hwang et al. | 375/148 |

OTHER PUBLICATIONS

Jafar, S.A., "Fundamental Capacity Limits of Multiple Antenna Wireless System", A Dissertation Submitted to the Department of Electrical Engineering and the Committee on Graduate Studies of Stanford University in Partial Fulfillment of the Requirements for the Degree of Doctor of Philosophy, Aug. 2003, 137 pages.

Jindal and Goldsmith, "Capacity and Dirty Coding for Gaussian Broadcast Channels with Common Information". Information Theory, 2004. ISIT 2004. Proceedings. International Symposium, [on-line]. Jun. 27-Jul. 2, 2004 [Retrieved Aug. 3, 2011]. Retrieved from Internet Electronic mail: http://systems.stanford.edu/docs/jindal_isit04.pdf, 215.

Jindal and Goldsmth, "Dirty Paper Coding vs. TDMA for MIMO Broadcast Channels". IEEE International Conference on Communications [online]. Jun. 2004 [Retrieved Aug. 3, 2011]. Retrieved from Internet Electronic mail: http://www.dtc.umn.edu/publications/reports/2004_57.pdf.

Palermo N., "A 9 MHz Digital SSB Modular" [online]. Dec. 26, 2007 [Retrieved on Aug. 3, 2011]. Retrieved from Internet Electronic mail: http://www.microtelecom.it/ssbdex/ssbdex-e.htm.

Rohde & Schwarz, Introduction to MIMI, Application Note [on-line]. [Retrieved on Aug. 30, 2011]. Retrieved from Internet Electronic mail: http://www2.rohde-schwarz.com/file_12364/1MA142_0e.pdf.

\* cited by examiner

*Primary Examiner* — Khanh C Tran
(74) *Attorney, Agent, or Firm* — Fish & Richardson P.C.

(57) ABSTRACT

Systems, methods, and devices for MIMO communications with reduced compute complexity are disclosed. Spectrally whitened communications are received, magnitude distortion is removed and phase distortion is corrected. The magnitude distortion is removed separately from the correction of the phase distortion, thereby reducing the compute complexity.

19 Claims, 6 Drawing Sheets

MIMO WITH REDUCED COMPUTE COMPLEXITY

CROSS-REFERENCE TO RELATED APPLICATIONS

This Application claims priority under U.S.C. §119(e) to U.S. Provisional Application Ser. No. 61/046,652, filed on Apr. 21, 2008, the disclosure of which is incorporated herein by reference.

BACKGROUND

This document relates to electromagnetic spectrum allocation and utilization.

Given any particular signal power relative to noise, it is possible to achieve the highest channel capacity by spreading a signal across as much spectrum as possible. Thus, optimal utilization of spectrum may be achieved by spreading a signal across as much spectrum as possible, e.g., optimal channel capacity can be achieved by making a signal as much like Additive White Gaussian Noise as possible.

This aspect of spectrum utilization also provides for uncoordinated band allocation in which a signal in the band appears as noise in relation to other signals in the band. Such uncoordinated band allocation results in optimal cumulative spectrum utilization. Utilization can be increased using Multiple-Input, Multiple-Output (MIMO), which uses multiple antennas at both the transmitter and receiver to improve communication performance. MIMO increases spectrum capacity in accordance with the number of transmit antennas and receive antennas above what could otherwise have been achieved because the number of independent channels available in a given spectrum band is increased.

The use of multiple transmit and receive antennas in the MIMO array, however, increases the complexity of recovering the communications on any given channel. MIMO processing involves matrix operations that are used to characterize the communications that are occurring over the channels of the MIMO array. As the number of antennas in the MIMO array increases, the size of the matrix operations used to characterize the communications likewise increase. In turn, the complexity of any computations also increases geometrically.

SUMMARY

In general, one aspect of the subject matter described in this document can be embodied in methods that include the actions of receiving spectrally whitened communications, removing magnitude distortion associated with the spectrally whitened communications and correcting phase distortion associated with the spectrally whitened communications, wherein correcting the phase distortion and removing the magnitude distortion are performed separately. Other embodiments of this aspect include corresponding systems, apparatus, and computer program products.

Particular implementations of the subject matter described in this document can be implemented so as to realize one or more of the following advantages. One advantage realized is reduced compute complexity for accomplishing MIMO communications. The complexity can be reduced, for example, by realizing the ability to separately correct magnitude and phase distortions in received signals. Yet another advantage is increased data rates for wireless communications.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
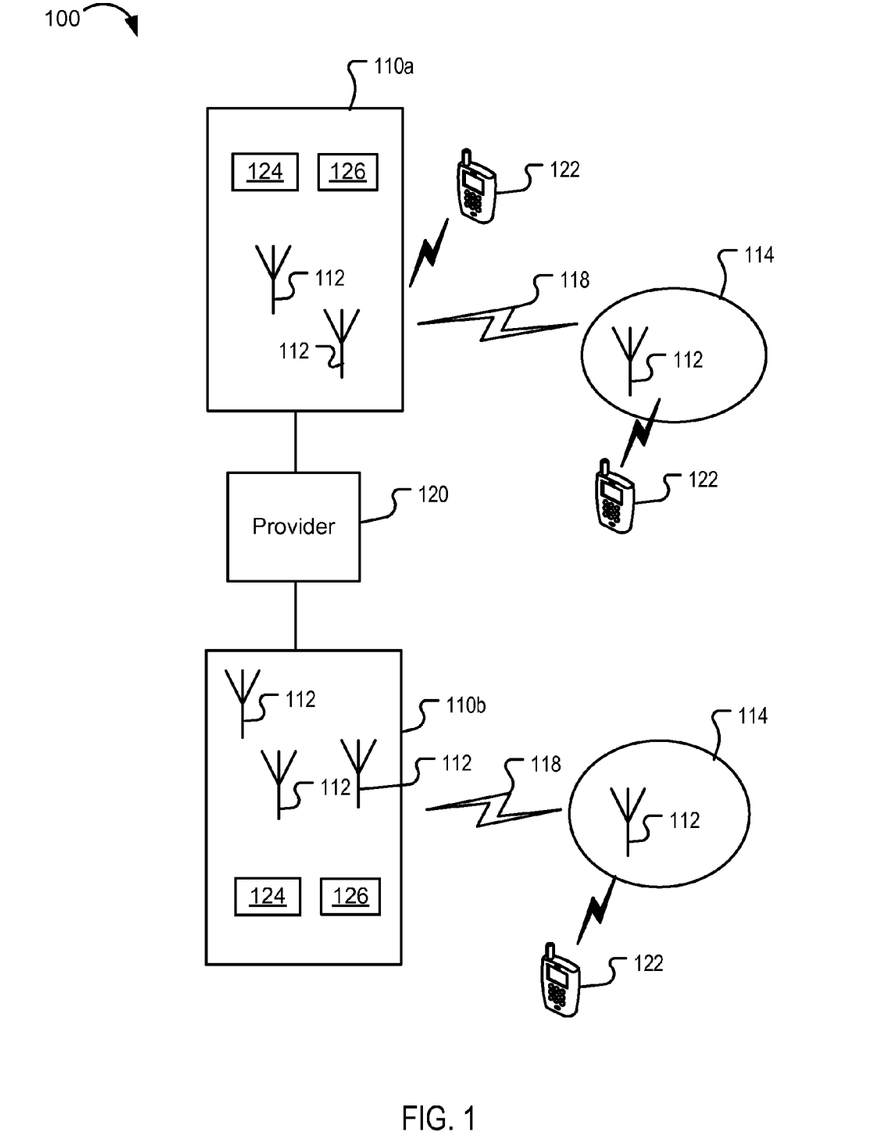
FIG. 1 is a block diagram of a communications network for utilizing electromagnetic spectrum.

FIG. 1 is a block diagram of a communications network 100 for utilizing electromagnetic spectrum. In some implementations, one or more base stations 110a and 110b can be provided. The base stations 110a and 110b can include access points 112 using a predetermined portion of the electromagnetic spectrum. The access points 112 can be arranged as a Multiple-In, Multiple-Out (MIMO) antenna array, which uses multiple antennas at the transmitter and receiver. In some implementations, the access points 112 can communicate in the 500 MHz-700 MHz spectrum. Other frequency ranges can also be used.

MIMO technology increases the data throughput and link range through higher spectral efficiency and link diversity. MIMO systems transmit a data stream on each of the transmit antennas, which increases the overall bandwidth of the system. The data streams associated with a particular antenna are intended for a corresponding receiver antenna. The communications link between the transmitter and the intended receiver is a channel of the MIMO system.

In addition to being received by the intended antenna, data streams transmitted over a channel are also received by the other receiver antennas over different transmission paths. The transmitted data streams intended for a particular antenna can interfere with communications intended for the other receiver antennas. Therefore, interference cancellation techniques are implemented to reduce the effects of the interference and maintain link diversity.

For example, each of the access points 112 can communicate with a wireless device 122 over a wireless link 118 as part of a MIMO array. In a downlink scenario (e.g., transmissions from base station 110a to the wireless devices 122), each access point 112 can be a transmit antenna in the MIMO array while each wireless device 122 can be a receive antenna in the MIMO array. Accordingly, an access point 112 can transmit data that is intended for a particular wireless device 122 over a channel (e.g., a link between corresponding antennas) in the MIMO array.

While the transmitted data can be received by the particular wireless device, it can also be received by other wireless devices that are within the range of the access point 112. In turn, the data transmitted on one channel may interfere with the data transmitted on other channels. Therefore, interference cancellation techniques can be used to cancel the interference from an access point that is transmitting data intended for another wireless device.

In an uplink scenario (e.g., transmissions from the wireless devices 122 to the base station 110a), the wireless devices 122 are the transmit antennas of the MIMO array and the access points are the receive antennas. In this scenario, the transmissions from the wireless devices can similarly cause interference on other channels in the MIMO array. Therefore, interference cancellation techniques can be implemented in an access point 112 to cancel interference from a wireless device 122 that is transmitting data intended for another access point.

The interference cancellation techniques implemented in the access point 112 can be performed, for example, by identifying communications that are occurring between the access points 112 within a single base station 110a and the wireless devices 122. The base station can identify the access points 112 within the base station 110a and the wireless devices 122 that are communicating with the base station 110a (e.g., within a communications cell) as antennas of a MIMO array and perform MIMO cancellation techniques.

The base stations 110a and 110b can communicate to a service provider 120 using a fixed communications link, such as a wide area network, a fiber optic link, a satellite link, or other available link. In some implementations, one or more repeaters 114 can be provided. Each repeater 114 can have one or more access points 112 operating similarly as in the base stations 110a and 110b in order to improve the range of a communications network. In some implementations, the repeaters 114 can be located in a mobile environment (e.g., in a vehicle). In other implementations, the repeaters 114 can be located in a fixed environment (e.g., a building, a residential dwelling, a utility pole).

Wireless devices 122 can communicate to the base stations 110a and 110b or the repeaters 114 to access services provided by a provider 120. The repeaters 114, wireless devices 122 and base stations 110a and 110b can communicate with each other using wireless links 118. Alternatively, a combination of wireless links 118 and fixed links (e.g., wire, fiber) can be used. The repeaters 114 can be spatially arranged according to the propagation characteristics of the spectrum in use, which in the case of the broadcast television spectrum can be approximately 10 km apart. In some implementations, the repeaters 114 and wireless devices 122 can communicate, for example, at 100 mW in the mobile environments and 1 W in fixed environments. Other communication specifications can also be used.

In some implementations, Ultra-Wide-Band (UWB) communications can be performed between the base stations 110a and 110b, repeaters 114 and wireless devices 122 using direct sequence spread spectrum (DSSS), which more nearly approaches the information theoretic ideal of representing a signal by white noise. Interference and multi-path distortion, however, can distort the communications signal, in both magnitude and phase, to such a degree that recovering the base band signal generally requires determining a transfer function of the received communications.

The compute complexity associated with recovering the transfer function of a UWB DSSS signal transmitted over a MIMO link can reduce the efficiency of the transmission and in some situations prevent real time communications. For example, because a MIMO array is represented by a matrix, the transfer function of the matrix can be recovered by inverting the matrix. Using the inverted matrix, the magnitude distortion and phase distortion associated with the received signal are corrected at the same time. As the number of antennas in the array increases, however, so does the complexity required to complete the inversion of the matrix. In some situations, the complexity of the computations required can become so great that the computations cannot be performed fast enough to support real time communications.

In some implementations, the spectral flatness of the DSSS signal can be exploited to reduce the compute complexity associated with recovering the transfer function of the MIMO matrix. For example, knowing that the DSSS signal is spectrally flat enables separate correction of the magnitude distortion and phase distortion associated with the communications signal. Accordingly, the transfer function can be recovered by separately correcting the magnitude distortion and the phase distortion, rather than computing the inverse of a transfer matrix.

For example, in some implementations, the magnitude distortion can be corrected separately from the phase distortion by removing the periodic and semi-periodic signals from the communications signal. Removing the periodic and semi-periodic signals results in a spectrally flat signal that approximates a white signal. Periodic and semi-periodic signals can be removed by a magnitude correction module 124. An example magnitude correction module 124 is a gradient adaptive lattice (GAL), as described in reference to FIG. 3A.

Similarly, in some implementations, the phase distortion can be corrected independently and separately from the magnitude distortion by identifying the transfer function and applying the transfer function to a finite impulse response (FIR) filter that, in turn, adjusts the phase of the communications signal to correct for the phase distortion. The phase distortion can be corrected, for example, using a phase correction module 126. An example phase correction module 126 is a temporal autocorrelator (TAC), as described in reference to FIG. 3A. In some implementations, the phase distortion can be corrected either in the transmitter (e.g., precoding) or in the receiver (e.g., decoding).

Figure 2:
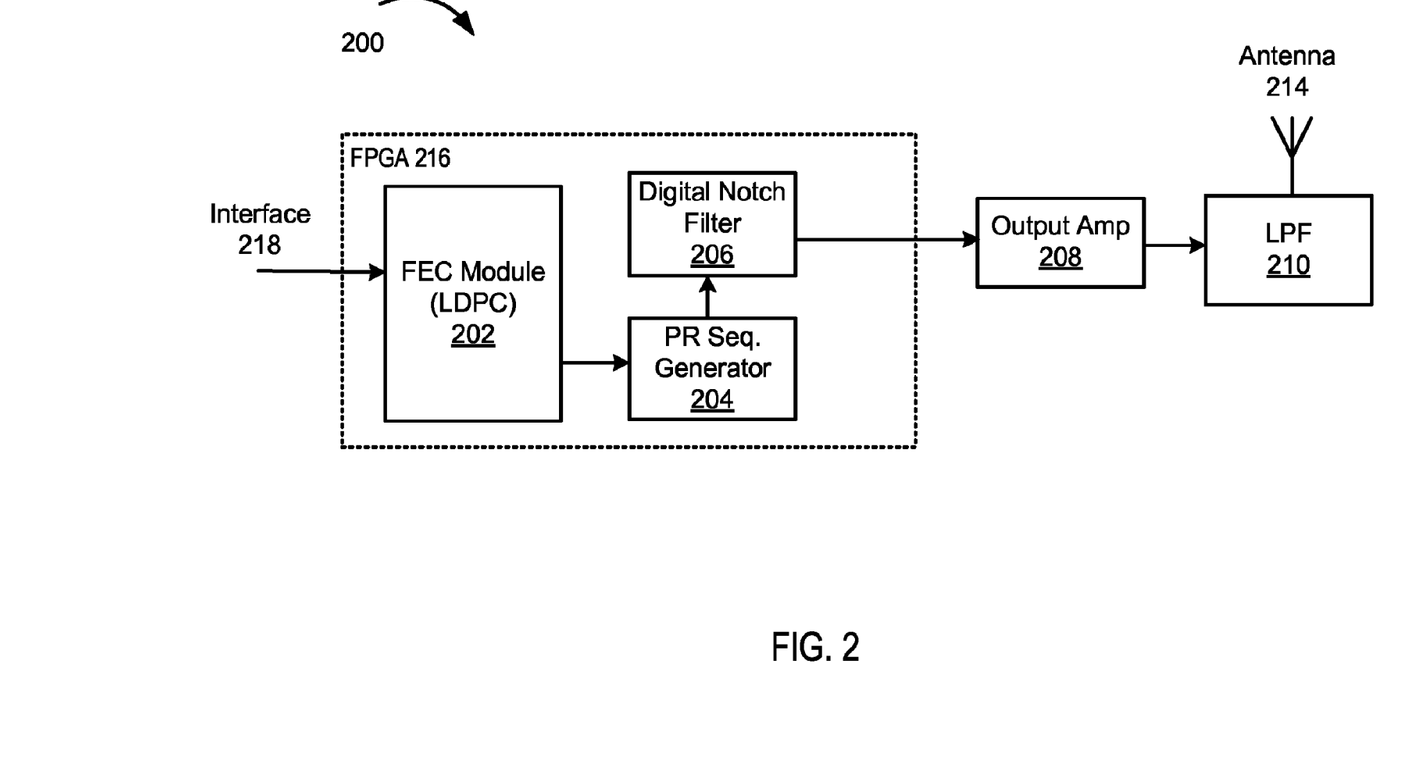
FIG. 2 is a block diagram of an example transmitter.

FIG. 2 is a block diagram of an example transmitter 200. The transmitter can include a forward error correction module 202, a pseudo-random sequence generator 204, an optional digital notch filter 206, an output amplifier 210, a low pass filter (LPF) 210 and an antenna 212. In some implementations, the forward error correction module (FEC) 202, pseudo-random sequence generator 204 and digital notch filter 206 can be implemented in a field programmable gate array 216 having an interface 218. Other implementations can also be used, e.g., discrete components, software, etc.

A data stream is received at the interface 218 and passed to the forward error correction module 202. The interface can be a data bus from a data source (not shown). Alternatively, the interface 218 can be data bus from a receiver (not shown) that receives data and passes the data to the transmitter 200.

The forward error correction module 202 adds redundant information to the data stream so that errors on the receive side can be detected and corrected. The forward error correction module 202 can be implemented, for example, as a low-density parity-check code. Other forms of forward error coding can also be used, such as product codes, etc.

The output of the forward error correction module 202 is received at the pseudo-random sequence generator 204. The pseudo-random sequence generator 204 applies a pseudo-random code to the data to distribute the data over the available spectrum as evenly as possible, thereby spectrally whitening the communications signal. The pseudo-random code can be implemented, for example, as a shuffled Hadamard matrix. An example implementation of a shuffled Hadamard matrix is described in U.S. Pat. No. 6,829,289 entitled, "Application of a Pseudo-Randomly Shuffled Hadamard Function in a Wireless CDMA System," issued to Gossett et al., which is incorporated by reference in its entirety herein. Using a shuffled Hadamard matrix produces a much flatter spectrum than a non-shuffled Hadamard matrix, while maintaining orthogonality between the columns of the matrix. While a shuffled Hadamard matrix is presented as a technique for creating a flat spectrum, other techniques can also be used, such as Orthogonal Frequency Division Multiplexing.

In some implementations, the output of the pseudo-random sequence generator 204 is received at the optional digital notch filter 206. The digital notch filter 206 prevents the transmitter from transmitting in restricted bands or otherwise encroaching on restricted bands. In some implementations, the digital notch filter 206 can be used when transmitting in an unlicensed band of the spectrum that has licensed users. For example, wireless devices can be licensed or highly prioritized for particular uses within the unlicensed spectrum. Unlicensed wireless devices or wireless devices that are prioritized lower than the highly prioritized wireless devices can be required to reduce interference with these licensed devices and/or prioritized devices. Therefore, the digital notch filter 204 can filter out the portions of the spectrum that are being used by licensed devices and/or prioritized uses. The output of the digital notch filter 206 is passed to an output amplifier 208.

In some implementations, the output of the pseudo-random sequence generator 204 can be provided directly to the output amplifier 208. The output amplifier 208 provides an amplified output that is passed through the low pass filter 210 and drives the antenna 214.

Figure 3A:
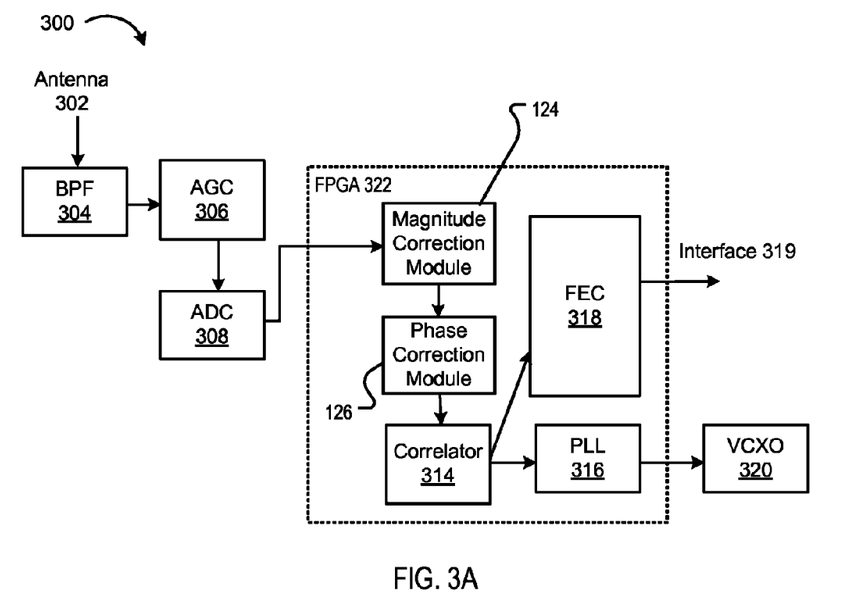
FIG. 3A is a block diagram of an example receiver.

FIG. 3A is a block diagram of an example receiver 300. The receiver 300 can include an antenna 302, a band pass filter 304, an automatic gain controller 306, an analog to digital converter 308, a magnitude correction module 124, a phase correction module 126, a correlator 314, a phase locked loop 316, and a forward error correction module 318. The magnitude correction module 124 and phase correction module 318 can be implemented to separately correct for magnitude distortion and phase distortion to reduce the compute complexity required for MIMO communications. In some implementations, the magnitude correction module 124, phase correction module 312, correlator 314, phase locked loop 316, and forward error correction module 318 can be implemented in an field programmable gate array 322. In other implementations, the components can be implemented by discrete circuit components. Other implementations can also be used.

The antenna 302 receives communications signals and passes the communications signals to the band pass filter 304. In some implementations, the communications signals can be UWB DSSS signals.

The band pass filter 304 selects a desired spectrum (e.g., 488.8 MHz-733.2 MHz) of the communications signals to be passed to the automatic gain controller 306. In some implementations, the band pass filter 304 functions as an anti-aliasing filter by only allowing communications signals that are operating in the desired spectrum to pass through the band pass filter 304, thereby preventing aliasing when the communications signals are digitized.

The communications signals that are within the desired spectrum are received by the automatic gain controller 306. The automatic gain controller 306 adjusts the magnitude of the communications signals to an appropriate level resulting in a gain-adjusted signal. In some implementations, the appropriate level is defined by the analog to digital converter 308. The analog to digital converter 308 digitizes the gain-adjusted signal. In some implementations, the analog to digital converter 308 can be an array of interleaved analog to digital converters. Using an array of interleaved analog to digital converters allows the spectrum to be divided for sampling purposes, thereby reducing the sample rate required to digitize the communications signals.

For example, in some implementations the analog to digital converter 308 includes four quadraplexed analog to digital converters that are used to digitize a spectrum that occupies, for example, 244.4 MHz of bandwidth. Using four quadraplexed analog to digital converters allows the 244.4 MHz spectrum to be treated as four 61.1 MHz bands of spectrum. Therefore, according to the Nyquist theorem a 122.2 MHz sample rate is sufficient to digitize each of the 61.1 MHz bands of the spectrum rather than the 488.8 MHz sample rate that would be required using a single analog to digital converter. In some implementations, this enables the receiver logic to run at 122.2 MHz rather than 488.8 MHz, which simplifies the design of the receiver. Other implementations, however, can also be used.

The digitized communications signal is passed to the magnitude correction module 124. In some implementations, the magnitude correction module 124 can be implemented as a linear predictive coding (LPC) filter. An example LPC filter is a gradient adaptive lattice (GAL) filter. An example GAL filter for correcting magnitude distortion is described in the Patent Application entitled "LPC Filter for Removing Periodic and Quasi-Periodic Interference from Spread Spectrum Signals," filed Dec. 11, 2001, Ser. No. 10/015,013 and which is incorporated by reference in its entirety herein. The gradient adaptive lattice can be implemented in the time domain or the frequency domain. Other implementations can also be used.

Because the communications signal is known to be approximately spectrally white, magnitude distortion in the communications signal can be corrected, for example, by identifying periodic and quasi-periodic signals and removing them from DSSS communications. In some implementations, the gradient adaptive lattice identifies the periodic and quasi-periodic signals in the time domain by comparing the incoming digitized (e.g., 4 bit) signal with successively delayed versions of the incoming digitized signal to measure the energy with respect to the delay (e.g., a comb filter in the frequency domain).

Over time, the comparison results in coefficients that represent the periodic and quasi-periodic signals as well as an error term that represents the non-periodic signals. The identified coefficients are discarded while the error term is retained. Discarding the identified coefficients results in elimination of periodic and quasi-periodic signals from the digitized communications while retaining the pseudo-random communications, e.g., the DSSS signal. Therefore, the remaining signal will approximate a white signal and have a flat spectral distribution.

Figure 3B:
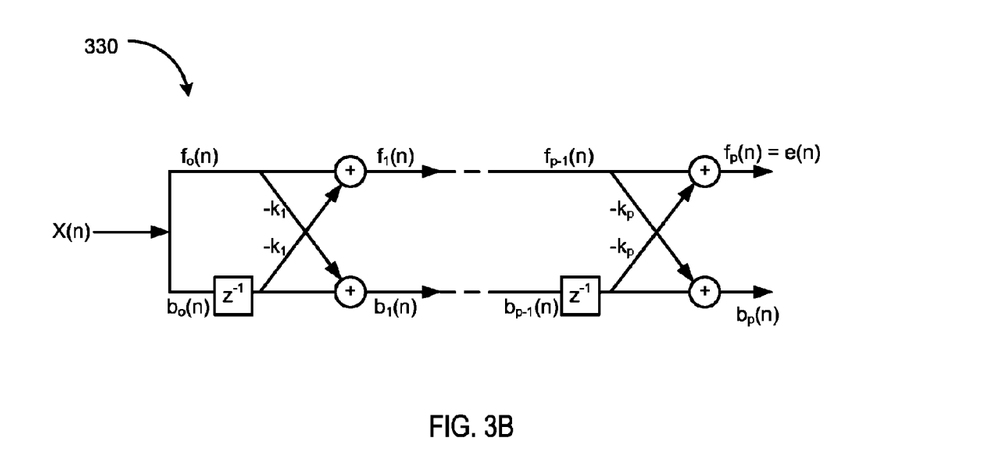
FIG. 3B is an illustration of an example gradient adaptive lattice.

FIG. 3B is an illustration of an example gradient adaptive lattice 330. The energy of an m-th order predictor for the gradient adaptive lattice can be represented, for example, by:

$$J_m(n) = f_m^2(n) + b_m^2(n) \text{ where}$$

$f_m(n)$ represents a forward prediction error, and
$b_m(n)$ represents a backward prediction error.
Using gradient descent, the coefficient update can be represented by:

$$k_m(n+1) = k_m(n) - [\text{mu}_m * dJ_m(n)/dk_m(n)]$$

where $$dJ_m(n)/dk_m(n) = -2 * [f_m(n) * b_{m-1}(n-1) + b_m(n) * f_{m-1}(n)]$$

This provides a sample-by-sample update of the lattice coefficients.

In some implementations, the constant $mu_m$ is picked arbitrarily to be $1/256$, giving a rate of convergence that facilitates real time wireless communications. For any input periodic signal (e.g., sine, triangle, ramp, etc.) or quasi-periodic signal (e.g., sums of periodic signals) received at the gradient adaptive lattice the output eventually becomes zero. If the gradient adaptive lattice is implemented in the frequency domain, the spectra of the corresponding signals are multiplied rather than added. Example equations are presented for removing the magnitude distortion associated with the communications, but other equations can be used to correct the magnitude distortion.

While the gradient adaptive lattice can extract the central peak of periodic interferers even in the presence of noise, the remaining white signal (e.g., DSSS signal) can still contain phase distortion after the periodic and quasi-periodic signals have been extracted by the gradient adaptive lattice.

Referring again to FIG. 3A, once the magnitude distortion is corrected by the magnitude correction module 124, the digitized signal is passed to the phase correction module 126. The phase correction module 126 can correct the phase distortion of the digitized signal, for example, by determining the correlation between a time-averaged version of the impulse response and the incoming signal.

In some implementations, the phase correction module 126 can be implemented as a temporal autocorrelator. The temporal autocorrelator can perform an accumulation operation that correlates expected signals to the digitized signal over time. An example method and system for temporal autocorrelation filtering is described in the Patent Application entitled "A Method and System for Temporal Autocorrelation Filtering," filed Nov. 11, 2002, Ser. No. 10/299,285 and which is incorporated by reference in its entirety herein. The temporal autocorrelator can be implemented in the time domain or the frequency domain. Other implementations can also be used.

In some implementations, the temporal autocorrelator can identify a pilot signal. The pilot signals are signals that are exchanged between the base stations 110a and 110b and the wireless devices 122 to identify themselves in the network prior to communication. The pilot signal can be, for example, an 8 kilobit sequence that is known to the receiver. The temporal autocorrelator identifies the correlation between the incoming signal and the known 8 kb sequence in the time domain, for example, according to the formula:

$$\text{output}(n) = \Sigma_i \text{ coeff}_i(m) * \text{input}(n-i) \text{ where}$$

$$\text{coeff}_i(m) = \text{coeff}_i(m-1) + mu * (\text{corr}_i(m) - \text{coeff}_i(m-1))$$
and $$\text{corr}_i(m) = \Sigma_j (\text{expected pilot})(j) * (\text{actual pilot})(j-i)$$

In the above, i goes over all the taps of the filter, while j goes over all the chips, i.e., bits in a DSSS sequence, of the pilot symbol. The time variable n is per chip, while the variable m is per symbol time. The $\text{corr}_i$ are delayed versions of the pilot signal correlated against the expected pilot signal. These correlations are time-averaged to form the $\text{coeff}_i$ coefficients for correlation against the incoming signal. In some implementations, the time-averaging can be performed by leaky-integrating the correlations.

Leaky integration is an integration that "leaks" a specified amount of input over time, i.e., accounts for a signal decay over time. For example, the input is integrated over time (e.g., successive samples) while decaying, or leaking, at a rate proportional to its activity. In some implementations, the constant mu is picked arbitrarily to be $1/256$, giving a rate of convergence that facilitates real time wireless communications. At the end of the symbol time, if the correlation (e.g., sum) is high, it is determined that a pilot has been received.

In some implementations, multiple delay taps are used to identify the pilot in the presence of phase distortion. For example, in one implementation, 32 delay taps can be used. In turn, a correlator 314 is attached to the output of each of the delay taps. The pilot can be identified, for example, by identifying the tap having the largest accumulated value. The outputs of the delay taps represent a running impulse response spanning the time period of the samples accumulated that can be used as the tap weights for a FIR filter (not shown). The FIR filter can be applied to the received communications to correct the phase distortion associated with the received signal.

In other implementations, data symbols can be identified in a similar manner as the pilot signal. However, since multiple data symbols have to be identified, a correlator 314 corresponding to each symbol is connected to each delay tap. For example, if there are 16 symbols to identify, then 16 correlators are connected to the output of each of the delay taps (e.g., requiring a total of 16*32 correlators).

The impulse response of the digitized communications can drive a PLL 316. In turn, the output of the PLL 316 is connected to a voltage controlled crystal oscillator 320 that adjusts the timing of the receiver based on the output of the PLL 316.

The same pseudo-random sequence that was used to encode the communications signal at the transmitter is applied to the digitized signal to decode the digitized signal and recover the transmitted data. In some implementations, the recovered data can be provided to a forward error correction module 318 that can correct errors in the recovered data by detecting the redundant data that was included by the forward error correction module 202 in the transmitter 200.

The transmitter 200 and receiver 300 can be integrated as a transceiver to transmit and receive communications in the communications network 100. In some implementations, the transmitter 200 and receiver 300 are implemented in a MIMO communications system by using multiple antennas at both the transmitter 200 and receiver 300 of the transceiver. In some implementations, the MIMO system can have multiple antennas at the base station, while having a single antenna in each wireless device. In these implementations, the wireless devices are treated as a MIMO array even though the wireless devices may not be in direct communication with each other.

In some implementations, the MIMO system utilizes the gradient adaptive lattice to independently flatten magnitude and eliminate quasi-periodic interferers. Similarly, in some implementations the MIMO system utilizes the temporal autocorrelator to independently zero the phase of the communications signal. By using the independently processed signals corresponding to each link between the multiple transmitters and receivers, the effective total bandwidth can be increased while reducing the compute complexity generally required to process MIMO communications.

A channel interference cancellation technique can also be used to eliminate the effects of data transmitted on separate channels of the MIMO system. In some implementations, the channel interference cancellation technique can be implemented, for example, using spatial multiplexing and subtracting known channel interferers from a select channel transmission. Spatial multiplexing and interference subtraction can be implemented to provide the following channel capacity for M×N MIMO (M transmitters, N receivers) with a given bandwidth and signal to noise ration (SNR):

$$C = \min(M, N) * BW * \log_2\left(1 + \frac{\max(M, N)}{\min(M, N)} * SNR\right)$$

By providing coordination in the base station, a group of client nodes (e.g., wireless devices) can be treated as an array, even without any explicit communication between them. Therefore, the effects of separately encoded channels can simply be subtracted from the communications on a candidate channel. Other channel interference cancellation techniques can also be used (e.g., successive interference cancellation).

Figure 3C:
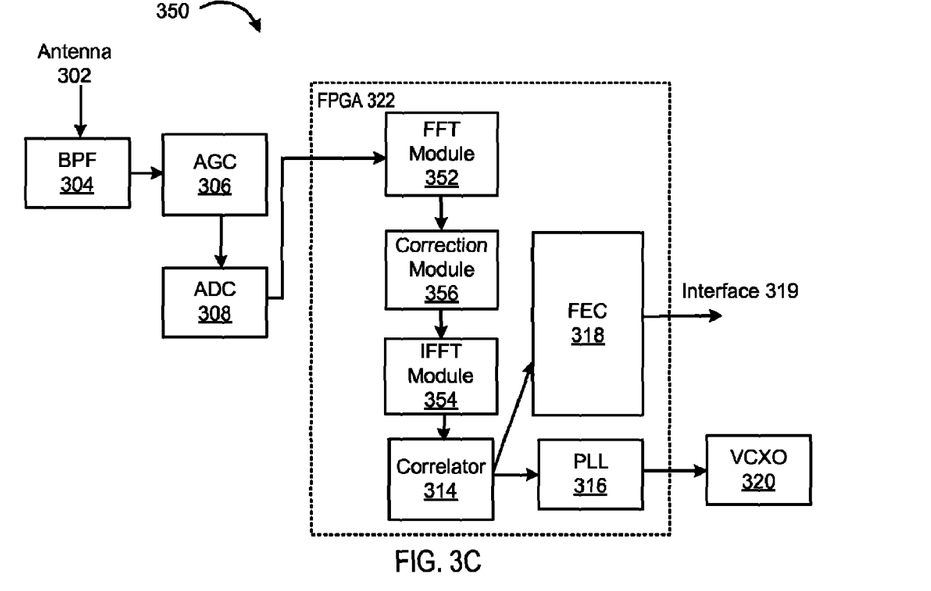
FIG. 3C is a block diagram of another example receiver.

FIG. 3C is a block diagram of another example receiver 350. The receiver 350 can be used, for example, to correct phase and magnitude errors associated with a received signal in the frequency domain. Similar to the example receiver 300 of FIG. 3A, the receiver 350 can include an antenna 302, a band pass filter 304, an automatic gain controller 306, an analog to digital converter 308, a correlator 314, a phase locked loop 316, and a forward error correction module 318. However, because the receiver 350 is correcting phase and magnitude in the frequency domain, the receiver can also include an FFT module 352 and an inverse FFT module 354. Additionally, phase correction and magnitude correction can be performed in conjunction with each other in the frequency domain. Accordingly, a single correction module 356 can be included in the receiver 350.

The antenna 302, band pass filter 304, automatic gain controller, 306 and analog to digital converter 308 of the receiver 350 operate in a manner similar to that discussed with reference to the receiver 300 of FIG. 3A.

A digitized communications signal is passed from the analog to digital converter 308 to the FFT module 350. The FFT module 352 performs an FFT on the received digitized communications signal and outputs the spectral components of the received signal and corresponding magnitudes.

In some implementations, the correction module 356 receives the spectra of the received signal and performs a series of operations on the spectra to correct phase and magnitude errors. The correction module 356 can perform a scaling operation on the spectra. The scaling can be performed, for example, by squaring the magnitudes of the spectra. The correction module 356 can also low pass filter the spectra to isolate a portion of the spectra to be corrected. The square root of the resulting low pass filtered signal can then be determined to remove the initial scaling. The reciprocal of the square root of the spectra can then be identified, which corresponds to a magnitude corrected version of the spectra of the received signal.

The correction module 356 can further correct for phase distortion by multiplying the received pilot signal spectra with the complex conjugate of the expected pilot signal spectra. The result corresponds to a phase corrected version of the spectra of the received pilot signal.

A final corrected signal can be identified by multiplying a complex conjugate of the magnitude corrected version of the spectra of the received signal, a complex conjugate of the phase corrected version of the spectra of the received signal, and the spectra of the received data sequence.

This final corrected spectra of the signal can be passed to the IFFT module 354. The IFFT module 354 can perform an inverse FFT on the final corrected spectra of the received signal to recover a time domain version of the received signal.

This time domain version of the signal can be used by the correlator 314, and, in turn, the FEC 318, and PLL 316 in a manner similar to that described in reference to FIG. 3A.

Figure 4:
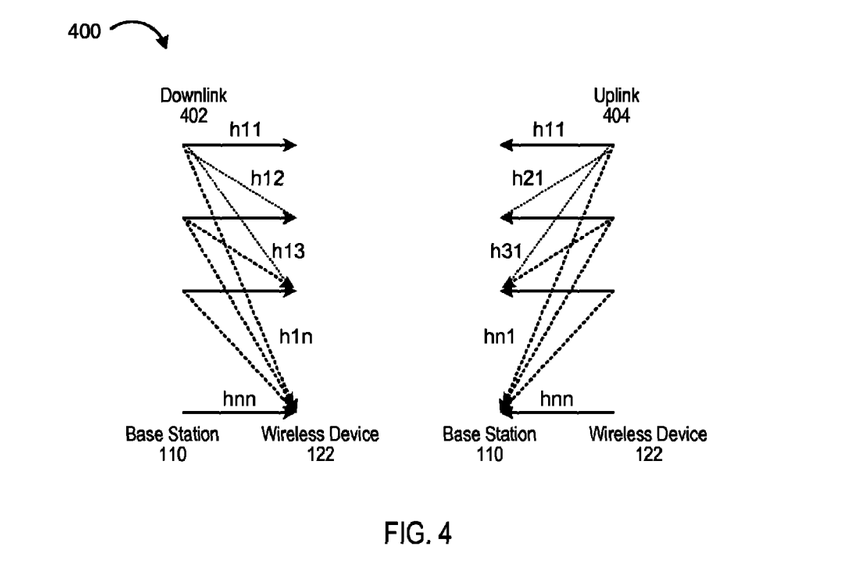
FIG. 4 is a diagram illustrating an example of MIMO coordination.

FIG. 4 is a diagram illustrating an example of MIMO coordination. The coordination can be performed on either the transmit side or the receive side, e.g., precoding for the "broadcast channel" downlink (DL) 402, and decoding for the "multiple access channel" uplink (UL) 404. The precoding and decoding can be performed, for example, to reduce interference that a wireless device or a base station experiences due to transmissions from antennas (e.g., wireless devices and the access points within the base station) in the communications cell. For example, the precoding and decoding can be performed according to the following equations:

DL: $T_n = X_n - (\Sigma_{i=1}^{n-1} T_i * h_{in}) * h_{nn}^{-1}$

UL: $Y_n = R_n - (\Sigma_{i=1}^{n-1} Y_i * h_{ni}^{-1}) * h_{nn}$

Where the following table identifies the notations used in the above equations.

| Notation | Meaning |
| --- | --- |
| T | Downlink channel output |
| X | Downlink channel input |
| h | Transfer matrix |
| R | Uplink channel input |
| Y | Uplink channel output |
| n | $n^{th}$ antenna |
| i | $i^{th}$ antenna |

In the downlink 402, differences in the gradient adaptive lattices at the wireless devices 122 (e.g., client nodes) can be ignored. However, differences between separate gradient adaptive lattices within the base station 110 should generally be identified and compensated for. The compensation can be performed, for example, by receiving the tap weights of the temporal autocorrelators, associated with each respective wireless device 122, at the base station 110 and adjusting the separate gradient adaptive lattices to compensate for any differences between the gradient adaptive lattices.

In the uplink 404, the receivers 300 at the base stations 110 have knowledge of their own gradient adaptive lattice and temporal autocorrelator, thereby enabling decoding by the base stations 110 without correcting for differences between the gradient adaptive lattices that are located in the client nodes. Accordingly, the decoding can be performed in a manner similar to that described in reference to the operation of the receiver 300, while canceling the effects of the interference experienced by the select channel from the other channels in the communications system.

Figure 5:
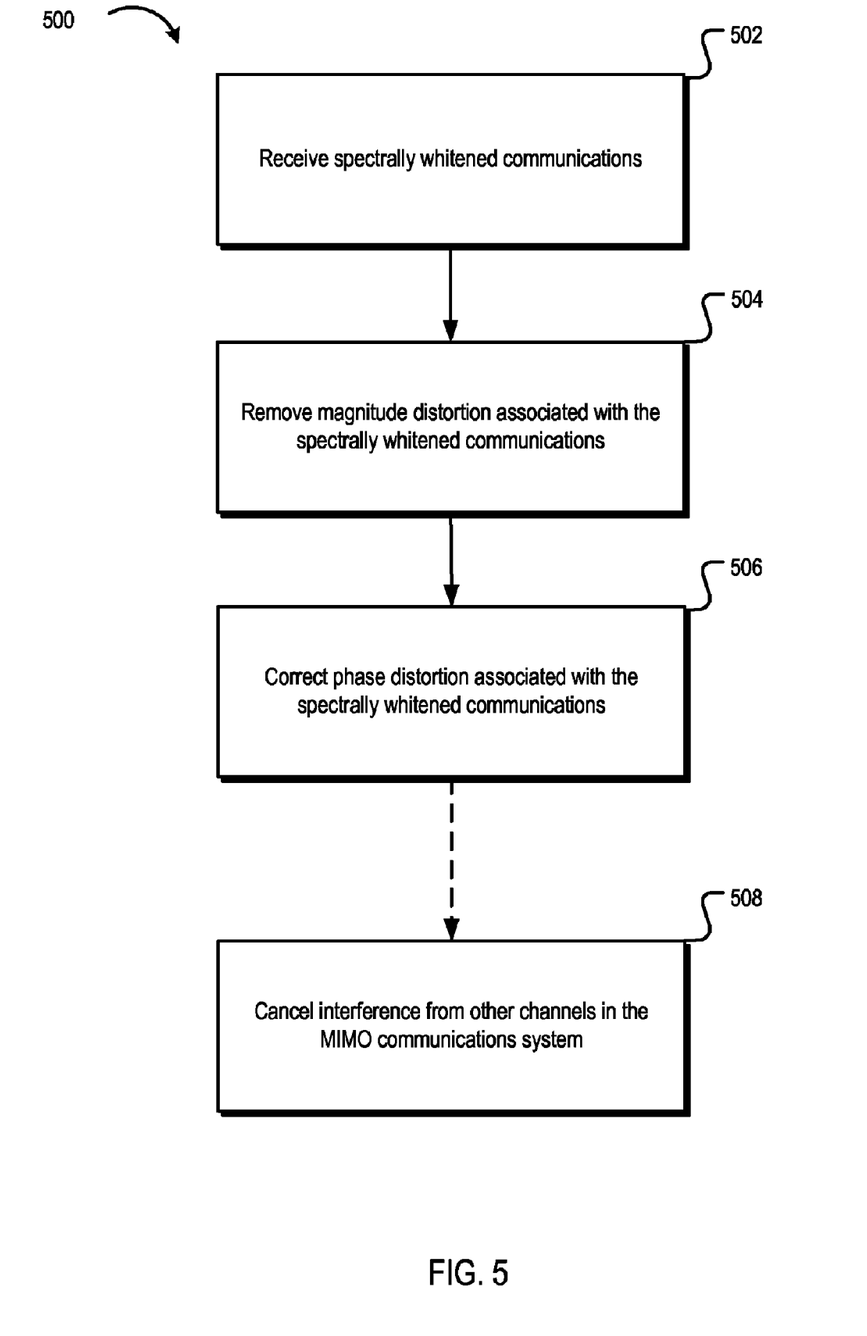
FIG. 5 is a flow chart illustrating a process of processing multiple input, multiple output communications

FIG. 5 is a flow chart illustrating a process 500 of processing multiple input, multiple output communications. The process 500 begins by receiving spectrally whitened communications (502). In some implementations, the communications can approximate a spectrally white signal. For example, a direct sequence spread spectrum communications signal that is encoded with a shuffled Hadamard matrix can approximate a spectrally white signal. In other implementations, the communications can be communications on a select channel in a MIMO communications system.

The process 500 continues by removing magnitude distortion associated with the communications (504). In some implementations, the magnitude distortion can be removed, for example, by identifying the periodic and semi-periodic signals in the communications and removing these periodic and semi-periodic signals. For example, a gradient adaptive lattice can be implemented to identify coefficients associated with the periodic and semi-periodic signals. Once the coefficients are identified they can be discarded and thereby removed from the communications, leaving only the noise, which includes the spectrally white communications signal.

The process 500 continues by correcting phase distortion associated with the communications (506). In some implementations, the phase can be corrected separately from the step of removing the magnitude distortion. For example, a temporal autocorrelation filter can be implemented to identify a time-averaged impulse response of the communications. Once the time-averaged impulse response is known, it can be applied to the received communications to correct the phase distortion associated with the communications. In some implementations, the time-averaged impulse response can be identified by correlating a delayed version of the communications to the communications and leaky integrating the results of the correlation.

The process 500 can optionally continue by canceling interference from other communications in the MIMO communications system (508). The interference experienced by the select channel due to other channels of the MIMO communications system is known by the receiver because it has received the interfering communications with the receive antennas associated with the other channels. Therefore, the interference from the other channels can be subtracted from the select channel (e.g., decoding). Other interference cancellation techniques can also be used (e.g., successive interference cancellation).

Figure 6:
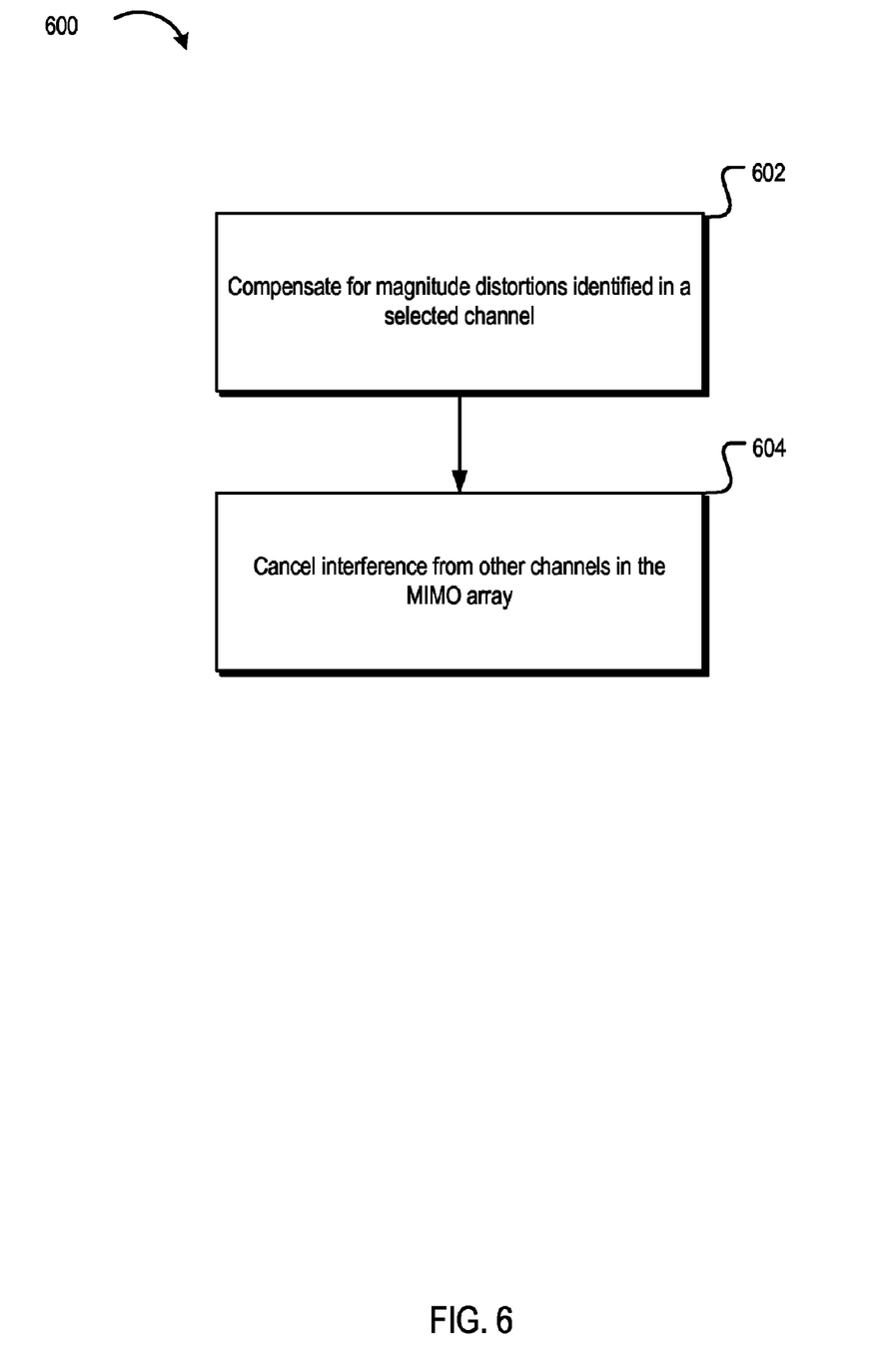
FIG. 6 is a flow chart illustrating a process of precoding multiple input, multiple output communications
Like reference numbers and designations in the various drawings indicate like elements.

FIG. 6 is a flow chart illustrating a process 600 of precoding multiple input, multiple output communications. The process 600 begins by compensating for magnitude distortions identified in the transmission channel (602). In some implementations, the magnitude distortion compensation can be performed, for example, by identifying the periodic and semi-periodic signals in the communications channel and compensating the channel transmission to account for these periodic and semi-periodic interferers.

For example, a gradient adaptive lattice can be implemented in a receiver to identify coefficients associated with the periodic and semi-periodic signals. The coefficients can be used to compensate for the magnitude distortion that will be encountered by the channel transmission. For example, the magnitude of the channel transmission can be adjusted so that the effects of these periodic and semi-periodic signals will result in a transmission that has an undistorted magnitude (e.g., approximates white noise). The magnitude distortions that are present in the transmissions channel can be identified, for example, by a receiver 300 including a magnitude correction module 124.

The process 600 continues by canceling the interference from other channels in the MIMO array (604). In some implementations, the interference that will be experienced by the communications on the select channel from the other channels is known by the transmitter. The interference is known because the transmitter is generating the data that is transmitted by the antennas associated with the other channels. Therefore, the transmitter can subtract the interfering data from the data transmitted on the select channel (e.g., precoding). Other interference cancellation techniques can also be used (e.g., successive interference cancellation).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of processing multiple input multiple output communications, the method comprising:
   receiving spectrally whitened communications;
   applying a linear predictive coding filter to the whitened communications to remove magnitude distortion associated with the spectrally whitened communications, wherein applying a linear predictive coding filter comprises:
      applying a gradient adaptive lattice to the spectrally whitened communications to remove periodic and semi-periodic signals;
      identifying coefficients associated with the periodic and semi-periodic signals; and
      discarding the coefficients; and
   correcting phase distortion associated with the spectrally whitened communications.

2. The method of claim 1, wherein the correcting and the applying a linear predictive filter are performed separately.

3. The method of claim 1, wherein correcting the phase distortion comprises:
   identifying a time averaged impulse response associated with the communications; and
   applying the time averaged impulse response to a FIR filter to cancel the phase distortion.

4. The method of claim 3, wherein identifying the time averaged impulse response comprises:
   delaying the communications to create delayed communications;
   correlating the delayed communications and the communications; and
   leaky integrating results of the correlation to identify the time averaged impulse response.

5. The method of claim 1, wherein correcting the phase distortion comprises applying a temporal autocorrelator to the communications to identify a time averaged impulse response associated with the communications and apply the time averaged impulse response to a FIR filter to cancel the phase distortion.

6. A method of processing multiple input multiple output communications, the method comprising:
   receiving spectrally whitened communications from a selected channel in a MIMO communications system;
   removing magnitude distortion associated with the spectrally whitened communications;
   correcting phase distortion associated with the spectrally whitened communications; and
   canceling interference from other channels in the MIMO communications system.

7. The method of claim 6, wherein canceling the interference from the other channels in the MIMO communications system comprises subtracting the interference from the communications.

8. The method of claim 6, wherein canceling the interference from the other channels in the MIMO communications system comprises performing successive interference cancellation.

9. A method of processing multiple input multiple output communications, the method comprising:
   receiving spectrally whitened communications;
   removing magnitude distortion associated with the spectrally whitened communications, wherein removing the magnitude distortion comprises applying a gradient adaptive lattice; and
   correcting phase distortion associated with the spectrally whitened communications, wherein correcting the phase distortion comprises applying a temporal autocorrelator to identify a time averaged impulse response associated with the communications and apply the time averaged impulse response to a FIR filter to cancel the phase distortion.

10. A system, comprising:
    a transceiver that transmits and receives spectrally whitened communications;
    a magnitude correction module that corrects magnitude distortion associated with the spectrally whitened communications;
    a phase correction module that corrects phase distortion associated with the spectrally whitened communications; and
    an interference correction module to correct, for select channel communications, interference from other communications channels, wherein the magnitude correction module and the phase correction module separately and respectively correct the magnitude distortion and the phase distortion of the spectrally whitened communications.

11. The system of claim 10, wherein the interference correction module subtracts the interference from the select channel communications.

12. The system of claim 10, wherein the magnitude correction module comprises a linear predictive coding filter.

13. The system of claim 12, wherein the linear predictive coding filter comprises a gradient adaptive lattice.

14. The system of claim 13, wherein the gradient adaptive lattice is configured to identify coefficients associated with periodic and semi-periodic signals.

15. The system of claim 10, wherein the phase correction module comprises a temporal autocorrelator.

16. The system of claim 15, wherein the temporal autocorrelator is configured to identify a time-averaged impulse response corresponding to the communications.

17. A system for processing multiple input multiple output communications, the system comprising:
   means for receiving spectrally whitened communications;
      means for correcting magnitude distortion associated with the spectrally whitened communications;
      means for correcting phase distortion associated with the spectrally whitened communications; and
      means for correcting, for select channel communications, interference from other communications channels, wherein the means for correcting magnitude distortion and the means for correcting phase distortion operate separately to respectively correct the magnitude distortion and phase distortion.

18. The system of claim 17, wherein:
   the means for correcting magnitude distortion includes means for removing periodic and semi-periodic signals from the communications; and
   the means for correcting phase distortion includes means for identifying a time-averaged impulse response corresponding to the communications and applying the time-averaged impulse response to the communications.

19. A method of precoding multiple input multiple output communications, the method comprising:
   compensating for magnitude distortions identified in a selected channel of a MIMO communications system that includes a MIMO array, wherein the compensating comprises:
      identifying coefficients associated with periodic and semi-periodic signals; and
      adjusting magnitudes of transmissions in the selected channel to offset effects of the periodic and semi-periodic signals; and
   canceling interference from other channels in the MIMO array.

* * * * *